United States Patent
Hasegawa

(10) Patent No.: US 10,647,281 B2
(45) Date of Patent: *May 12, 2020

(54) OCCUPANT RESTRAINING DEVICE FOR VEHICLE

(71) Applicant: TOYOTA JIDOSHA KABUSHIKI KAISHA, Toyota-shi (JP)

(72) Inventor: Takashi Hasegawa, Ashigarakami-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 81 days.

This patent is subject to a terminal disclaimer.

(21) Appl. No.: 15/836,984

(22) Filed: Dec. 11, 2017

(65) Prior Publication Data
US 2018/0222425 A1    Aug. 9, 2018

(30) Foreign Application Priority Data
Feb. 7, 2017    (JP) .................................. 2017-020637

(51) Int. Cl.
*B60R 21/0134*    (2006.01)
*B60R 21/02*    (2006.01)
(Continued)

(52) U.S. Cl.
CPC ...... *B60R 21/0134* (2013.01); *B60N 2/42727* (2013.01); *B60R 21/02* (2013.01); *B60R 2021/0004* (2013.01); *B60R 2021/01272* (2013.01)

(58) Field of Classification Search
CPC .. B60R 21/0134; B60R 21/02; B60N 2/42727
See application file for complete search history.

(56) References Cited

U.S. PATENT DOCUMENTS

| 5,186,494 A | 2/1993 | Shimose |
| 6,485,057 B1 | 11/2002 | Midorikawa |

(Continued)

FOREIGN PATENT DOCUMENTS

| EP | 1 415 872 A1 | 5/2004 |
| JP | 2001-239922 A | 9/2001 |

(Continued)

OTHER PUBLICATIONS

Office Action dated Jul. 2, 2019 in co-pending U.S. Appl. No. 15/726,436 dated Jul. 2, 2019, (9 pages).

(Continued)

*Primary Examiner* — Faye M Fleming
(74) *Attorney, Agent, or Firm* — Oblon, McClelland, Maier & Neustadt, L.L.P.

(57) ABSTRACT

An occupant restraining device for a vehicle has: a time to collision estimating section that estimates a time to collision, the time to collision being a time until a front collision with a vehicle ahead; a force imparting portion that imparts force toward a vehicle rear side to a vehicle occupant of an own vehicle; a gap enlarging portion that enlarges a gap between the vehicle occupant and a seatback of a vehicle seat; a gap estimating section that estimates a size of the gap between the vehicle occupant and the seatback; and a control section that, in a case in which the gap enlarging portion operates, controls a timing of a start of operation of the force imparting portion on the basis of the time to collision estimated by the time to collision estimating section and the size of the gap estimated by the gap estimating section.

6 Claims, 9 Drawing Sheets

(51) Int. Cl.
  *B60N 2/427* (2006.01)
  *B60R 21/01* (2006.01)
  *B60R 21/00* (2006.01)

(56) References Cited

U.S. PATENT DOCUMENTS

| | | | |
|---|---|---|---|
| 7,686,118 B2 * | 3/2010 | Akaba | B60R 21/013 |
| | | | 180/268 |
| 9,076,045 B2 * | 7/2015 | Atsmon | G01C 21/3602 |
| 9,443,152 B2 * | 9/2016 | Atsmon | H04N 7/185 |
| 2003/0030264 A1 | 2/2003 | Motozawa | |
| 2004/0084890 A1 | 5/2004 | Tobata | |
| 2004/0212189 A1 | 10/2004 | Kachu | |
| 2005/0252710 A1 | 11/2005 | Akaba | |
| 2006/0237960 A1 | 10/2006 | Kudo et al. | |
| 2011/0074190 A1 | 3/2011 | Hashimoto | |
| 2017/0274854 A1 | 9/2017 | Nagasawa | |
| 2018/0009403 A1 * | 1/2018 | Yamazaki | B60R 21/00 |
| 2018/0105136 A1 * | 4/2018 | Goto | B60R 21/013 |
| 2018/0222425 A1 | 8/2018 | Hasegawa | |

FOREIGN PATENT DOCUMENTS

| | | |
|---|---|---|
| JP | 2003-25889 | 1/2003 |
| JP | 2003-25955 | 1/2003 |
| JP | 2003-182519 | 7/2003 |
| JP | 2004-262256 | 9/2004 |
| JP | 2004-262259 A | 9/2004 |
| JP | 2005-263071 | 9/2005 |
| JP | 2006-175901 | 7/2006 |
| JP | 2006-281978 A | 10/2006 |
| JP | 2006-290258 A | 10/2006 |
| JP | 2006-298105 A | 11/2006 |
| JP | 2006-327413 A | 12/2006 |
| JP | 2017-1445 A | 1/2017 |

OTHER PUBLICATIONS

Office Action dated Mar. 15, 2019 in co-pending U.S. Appl. No. 15/726,436, 10 pages.
Notice of Allowance dated Oct. 30, 2019 in U.S. Appl. No. 15/726,436 (8 pages).

* cited by examiner

OCCUPANT RESTRAINING DEVICE FOR VEHICLE

CROSS-REFERENCE TO RELATED APPLICATION

This application claims priority under 35 USC 119 from Japanese Patent Application No. 2017-020637, filed Feb. 7, 2017, the disclosure of which is incorporated by reference herein.

BACKGROUND

Technical Field

The present invention relates to an occupant restraining device for a vehicle.

Related Art

As a vehicle occupant protecting device, a structure has been disclosed in which, in a case in which a front collision of a vehicle is sensed in advance, a seat moving mechanism and a seatbelt take-up mechanism are controlled interlockingly, and, after the seatbelt is taken-up, the seat is tilted rearward so as to enlarge the distance between the vehicle occupant and the steering wheel as compared with a usual state (refer to Japanese Patent Application Laid-Open (JP-A) No. 2006-175901).

Further, as a vehicle occupant protecting device, there has been disclosed a structure in which, by controlling the strength of restraining of a vehicle occupant by a seatbelt after a vehicle collision, a vehicle body deceleration waveform that reduces the deceleration of the vehicle occupant appropriately is realized, and a reduction in the injury value of the vehicle occupant is made possible (refer to JP-A No 2003-25955).

However, even if the distance between the vehicle occupant and the steering wheel is increased at the time of advance sensing of a collision as in JP-A No. 2006-175901, when the vehicle collision velocity or the vehicle occupant mass or the like is large and the kinetic energy of the vehicle occupant is large, there is the possibility that the energy absorption will be insufficient.

Further, even if the strength of restraining a vehicle occupant by a seatbelt after a collision is controlled as in JP-A No. 2003-25955, when the kinetic energy of the vehicle occupant is large, there is the possibility that the energy absorption will be insufficient.

Thus, at the time of advance sensing of a collision, it has been thought to reduce the initial kinetic energy that is due to the deceleration of the vehicle occupant, by enlarging the gap between the vehicle occupant and the seatback by operation of the brake or the like, and by, from before the collision through the initial stage of the collision, continuing to move the vehicle occupant toward the vehicle rear side by an actuator that pulls-in the seatbelt.

However, if, regardless of the size of the gap between the vehicle occupant and the seatback, the actuator is operated a given time before the time that it is predicted that a collision will occur, if the gap between the vehicle occupant and the seatback is small, the timing of the start of operation of the actuator will be too early, and the vehicle occupant and the seatback will become integral before the collision. Thus, there is the possibility that the energy absorption will be insufficient.

SUMMARY

The present invention provides an occupant restraining device for a vehicle that improves the vehicle occupant protecting performance at the time of a front collision of a vehicle.

An occupant restraining device for a vehicle of a first aspect of the present invention has: a time to collision estimating section that estimates a time to collision, the time to collision being a time until a front collision with a vehicle ahead; a force imparting portion that imparts force toward a vehicle rear side to a vehicle occupant of an own vehicle; a gap enlarging portion that enlarges a gap between the vehicle occupant and a seatback of a vehicle seat; a gap estimating section that estimates a size of the gap between the vehicle occupant and the seatback; and a control section that, in a case in which the gap enlarging portion operates, controls a timing of a start of operation of the force imparting portion on the basis of the time to collision estimated by the time to collision estimating section and the size of the gap estimated by the gap estimating section.

Note that "front collision" is not limited to a full overlap collision between the vehicles, and includes various forms of collisions that can arise in the direction in which the vehicle advances, such as a small overlap collision, an oblique collision, and the like.

In this occupant restraining device for a vehicle, in a case in which the gap enlarging portion operates, the control section controls the timing of starting the operation of the force imparting portion on the basis of the time to collision that is estimated by the time to collision estimating section and the size of the gap estimated by the gap estimating section.

Due thereto, the start of operation of the force imparting portion being too early, and the vehicle occupant and the seatback becoming integral before the collision, and the energy absorption being insufficient can be suppressed. Accordingly, the performance of protecting the vehicle occupant at the time of a front collision of the vehicle can be improved.

In an occupant restraining device for a vehicle of a second aspect of the present invention, in the first aspect, the control section starts the operation of the force imparting portion in a case in which the time to collision is less than or equal to a pull-back time that is needed to pull the vehicle occupant back toward the vehicle rear side by an amount corresponding to the size of the gap.

In this occupant restraining device for a vehicle, operation of the force imparting portion is started in a case in which the time to collision is less than or equal to the pull-back time that is needed to pull the vehicle occupant back toward the vehicle rear side by an amount corresponding to the size of the gap. Therefore, the vehicle occupant and the seatback becoming integral before the collision, and the energy absorption being insufficient can be suppressed precisely.

In an occupant restraining device for a vehicle of a third aspect of the present invention, in the first aspect or the second aspect, the gap estimating section estimates the size of the gap on the basis of at least one of a pull-out amount of a seatbelt that is applied to a vehicle occupant who is seated in the vehicle seat, captured images that capture the vehicle occupant, or deceleration of the own vehicle.

In this occupant restraining device for a vehicle, the size of the gap is estimated by using various types of information such as the pull-out amount of the seatbelt, captured images that capture the vehicle occupant, and deceleration of the own vehicle. Due thereto, the size of the gap can be acquired without directly measuring the size of the gap.

In an occupant restraining device for a vehicle of a fourth aspect of the present invention, in any one of the first through third aspects, the gap enlarging portion is at least one of a braking device that decelerates the own vehicle and tilts the vehicle occupant forward by inertia, a reclining device that tilts the seatback rearward, or a seat sliding device that moves the vehicle seat toward the vehicle rear side.

In this occupant restraining device for a vehicle, the gap between the vehicle occupant and the seatback can be enlarged by using at least one of a braking device that decelerates the own vehicle and tilts the vehicle occupant forward by inertia, a reclining device that tilts the seatback rearward, or a seat sliding device that moves the vehicle seat toward the vehicle rear side, as the gap enlarging portion. The region over which the chest region of the vehicle occupant can move toward the vehicle rear side can be enlarged by using various types of gap enlarging portions in this way.

In an occupant restraining device for a vehicle of a fifth aspect of the present invention, in any one of the first through fourth aspects, the force imparting portion is at least one of an explosive-type pretensioner or an electric motor that pulls-in a seatbelt that is applied to a vehicle occupant seated in the vehicle seat.

In this occupant restraining device for a vehicle, at least one of an explosive-type pretensioner or an electric motor that pull-in a seatbelt, which is structured so as to be able to be pulled into the vehicle and which is applied to a vehicle occupant seated in a vehicle seat, is used as the force imparting portion. For example, in a case in which operation of the explosive-type pretensioner and the electric motor are started simultaneously before a collision, force toward the vehicle rear side is imparted promptly to the vehicle occupant by the explosive-type pretensioner whose force of pulling-in the seatbelt is stronger than that of the electric motor, and, after the pulling-in of the seatbelt by the explosive-type pretensioner ends, pulling-in of the seatbelt by the electric motor is continued. Due thereto, force toward the vehicle rear side can be imparted promptly to the vehicle occupant by using various types of force imparting portions.

BRIEF DESCRIPTION OF THE DRAWINGS

Exemplary embodiments of the present invention will be described in detail based on the following figures, wherein.

DETAILED DESCRIPTION

Figure 1:
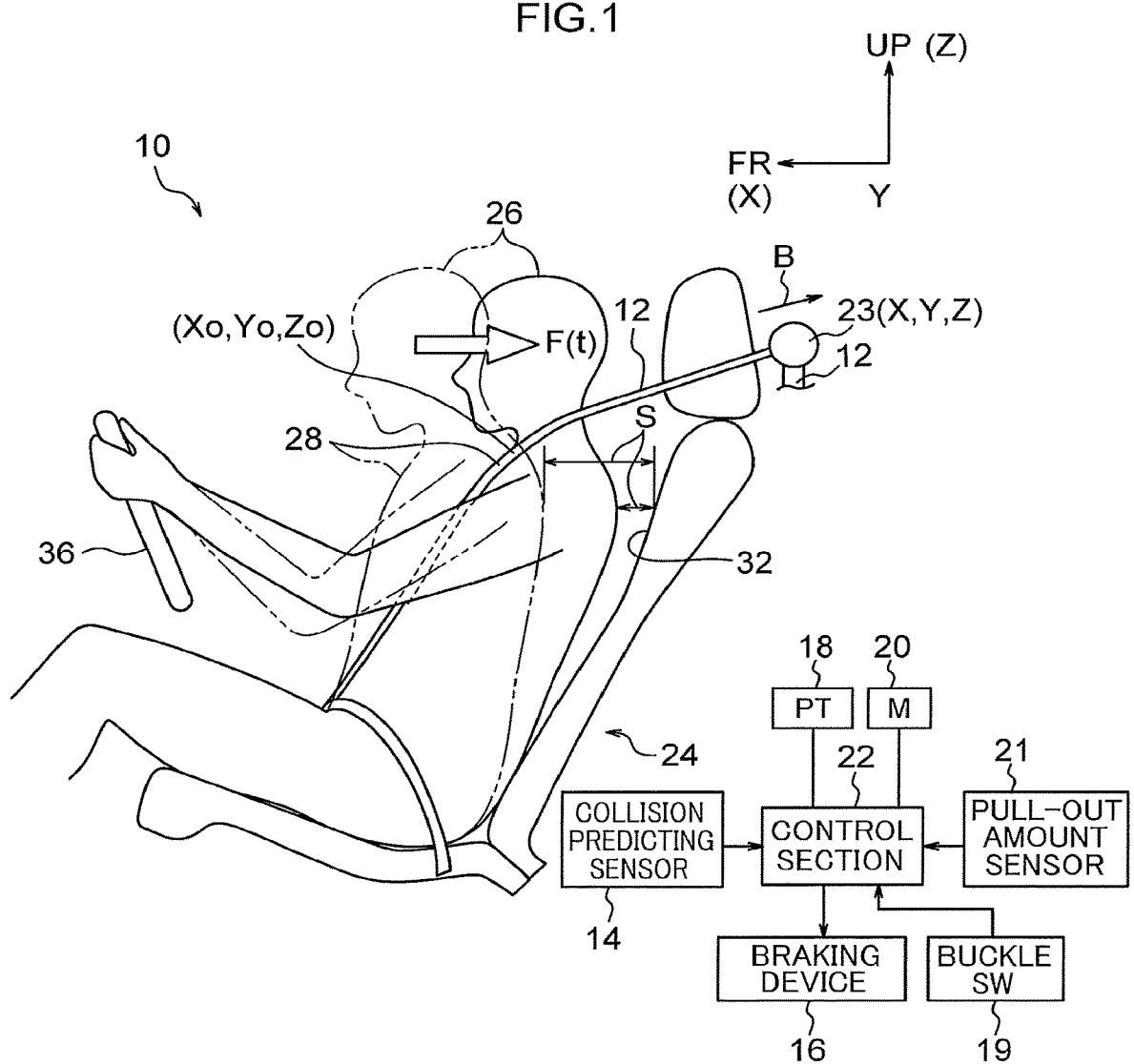
FIG. 1 is a side view and a block drawing schematically showing an occupant restraining device for a vehicle relating to a present embodiment.

Forms for implementing the present invention are described hereinafter on the basis of the drawings. In the drawings, arrow FR indicates the vehicle forward side, and arrow UP indicates the vehicle upward side.

In FIG. 1, an occupant restraining device 10 for a vehicle relating to the present embodiment has a three-point seatbelt 12, a collision predicting sensor 14, a braking device 16, an explosive-type pretensioner 18, an electric motor 20, a buckle switch 19, a pull-out amount sensor 21, and a control section 22. The braking device 16 is an example of the gap enlarging portion. Further, the explosive-type pretensioner 18 and the electric motor 20 are examples of the force imparting portion. The control section 22 is an example of the gap estimating section and the control section.

Figure 2:
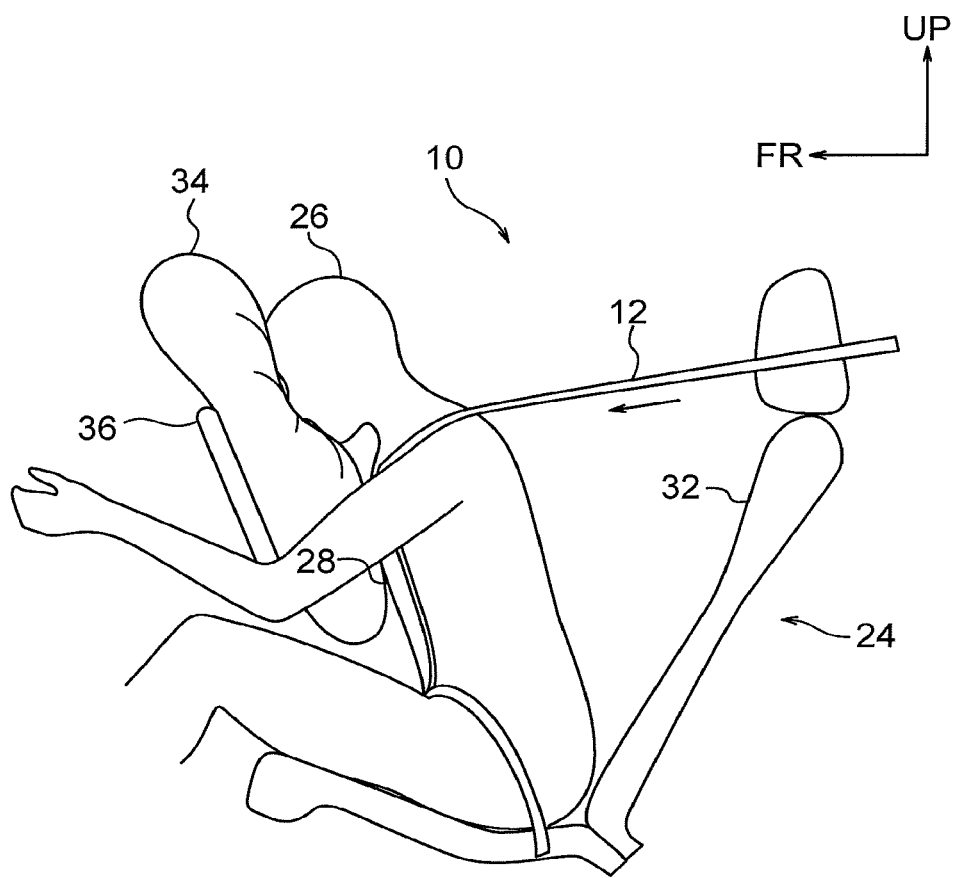
FIG. 2 is a side view showing a state in which a vehicle occupant has moved forward and is restrained by an airbag.

The seatbelt 12 is a webbing for restraining a vehicle occupant that is structured so as to be able to be pulled-in at the vehicle, and is non-extensible, and is applied to a chest region 28 and a lumbar region of a vehicle occupant 26 who is seated in a vehicle seat 24. The seatbelt 12 is structured such that, by being taken-up by an unillustrated retractor, the seatbelt 12 can be pulled-in the arrow B direction. In FIG. 1, the vehicle seat 24 is the driver's seat, and a steering wheel 36 is provided at the vehicle front side of the vehicle seat 24. An airbag 34 (FIG. 2) that serves as a vehicle occupant restraining device is housed in the steering wheel 36.

Figure 3:
FIG. 3 is a drawing showing a state in which a front collision between an own vehicle and a vehicle ahead is predicted.

The collision predicting sensor 14 detects a physical amount for sensing, in advance, a front collision between an own vehicle 30, which serves as an example of the vehicle, and a vehicle ahead 40 (FIG. 3). Examples of the physical amount are the relative distance, the relative velocity, and the relative acceleration with respect to the vehicle ahead 40. Any of various types of sensors such as a camera, millimeter wave radar, infrared laser, or the like can be used as the collision predicting sensor 14.

The braking device 16 enlarges a gap S between the vehicle occupant 26 and a seatback 32 by decelerating the vehicle and tilting the vehicle occupant 26 forward by inertia. This braking device 16 operates automatically due to a signal from the control section 22 at the time when a front collision is predicted, i.e., has an automatic braking function. At usual times, the braking device 16 is operated by operation of the vehicle occupant 26.

The explosive-type pretensioner 18 and the electric motor 20 are driving portions that pull-in the seatbelt 12, and are provided, for example, at a retractor (not illustrated) that is for taking-up the seatbelt 12. At the explosive-type pretensioner 18, an explosive is ignited by a signal from the control section 22, and, by utilizing the pressure of the gas that is generated due to this explosive combusting, the seatbelt 12 is pulled-in in the arrow B direction. Further, the electric motor 20 operates the retractor in the take-up direction by a signal from the control section 22, and pulls-in the seatbelt 12 in the arrow B direction.

The buckle switch 19 is a switch that turns on when a tongue plate of the seatbelt 12 is fixed to a buckle.

The pull-out amount sensor 21 detects the pull-out amount at the time when the seatbelt 12 is pulled-out from the retractor that takes-up the seatbelt 12. The pull-out amount can be computed on the basis of the output value of, for example, an encoder, a potentiometer, a gyro sensor (none of which are illustrated) or the like that is provided at the retractor that takes-up the seatbelt 12.

Occupant restraining processing for a vehicle that is executed at the control section 22 is described next as the operation of the present embodiment and with reference to the flowchart shown in FIG. 4.

Figure 4:
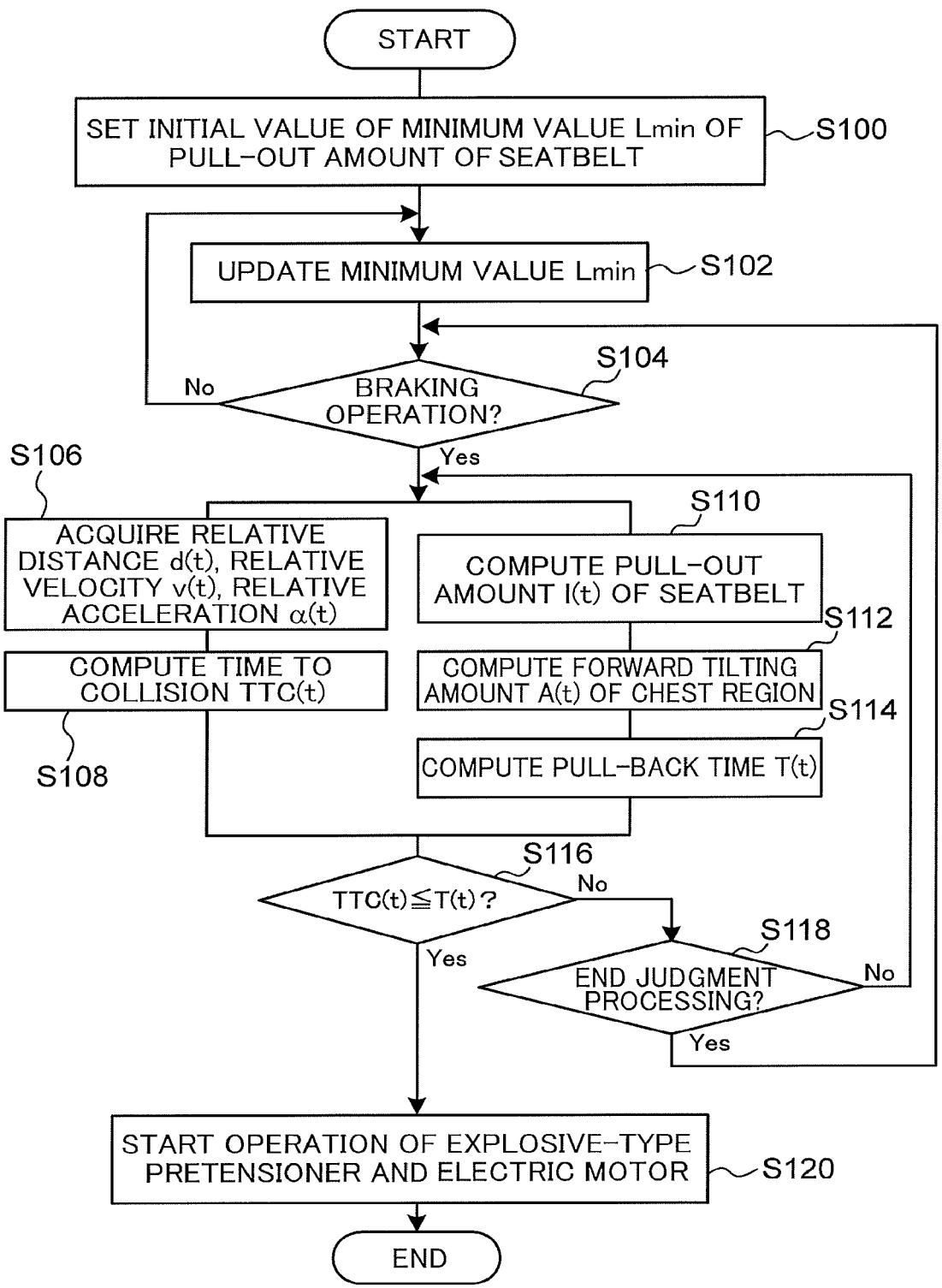
FIG. 4 is a flowchart of an occupant restraining program for a vehicle that is executed at a control section.
Figure 5:
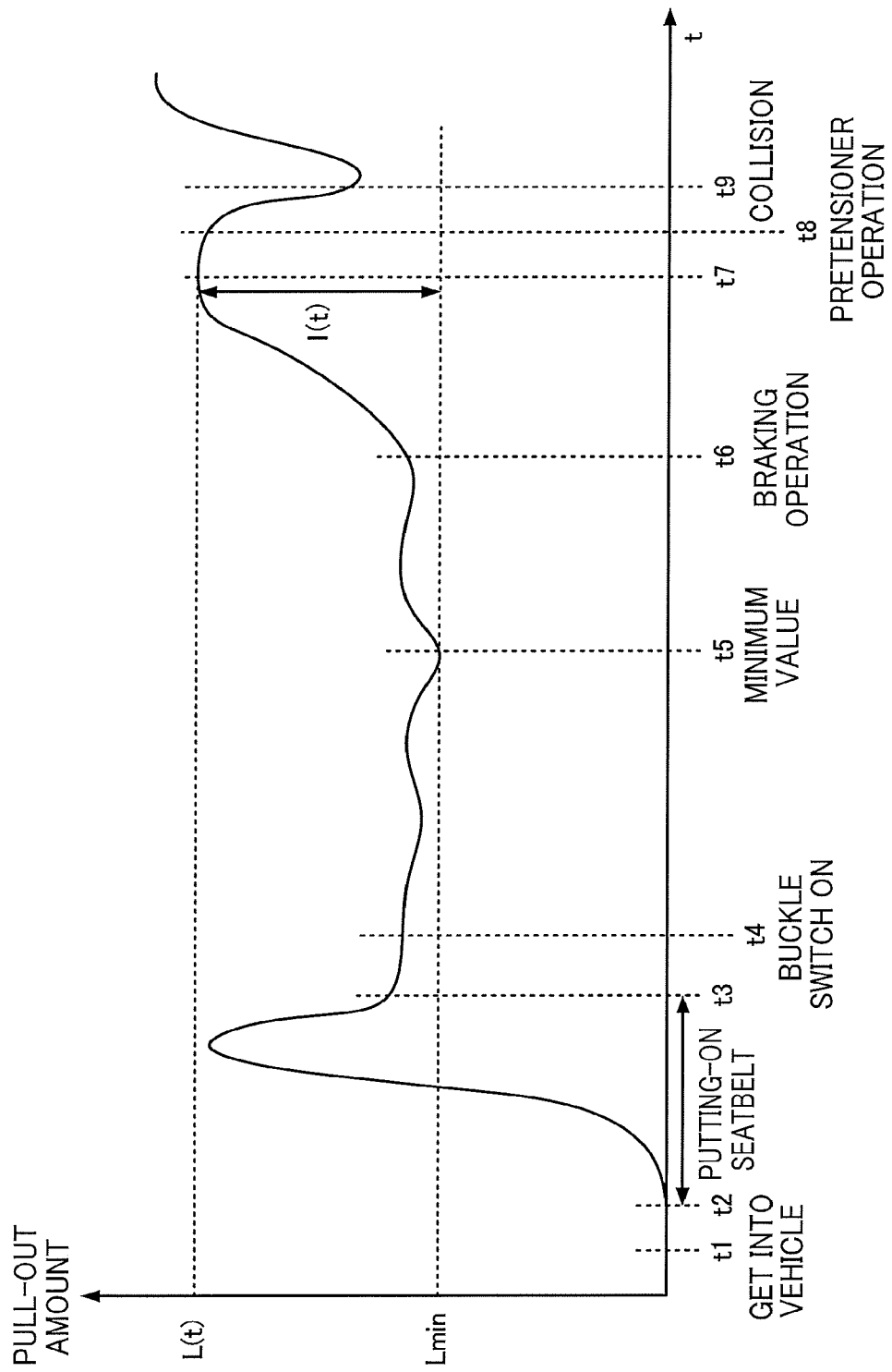
FIG. 5 is a graph showing changes over time in a pull-out amount of a seatbelt.

Note that the processing shown in FIG. 4 is executed in a case in which the seatbelt 12 is applied to the vehicle occupant 26 and the buckle switch 19 turns on. First, changes over time in the pull-out amount of the seatbelt 12 are described with reference to FIG. 5. In FIG. 5, time is plotted on the horizontal axis, and the pull-out amount of the seatbelt 12 is plotted on the vertical axis.

As shown in FIG. 5, for example, t1 is the point in time when the vehicle occupant 26 gets into the vehicle, and the time period from t2 to t3 is the time when the vehicle occupant is putting-on the seatbelt 12. During the time when the vehicle occupant is putting the seatbelt 12 on, the pull-out amount increases and decreases greatly. Further, when the buckle switch 19 turns on at point in time t4, the pull-out amount of the seatbelt 12 increases and decreases minutely up until point in time t6 when the brake is operated.

In the present embodiment, from t4, when the buckle switch is turned on, and thereafter, processing that updates minimum value $L_{min}$ of the pull-out amount of the seatbelt 12 is executed.

First, in step S100, the pull-out amount of the seatbelt 12 is acquired from the pull-out amount sensor 21, and the acquired pull-out amount is set as the initial value of the minimum value $L_{min}$.

In step S102, the pull-out amount is acquired from the pull-out amount sensor 21 and is compared with the minimum value $L_{min}$. Then, if the pull-out amount that is acquired this time is smaller than the minimum value $L_{min}$, the pull-out amount that is acquired this time is made to be the minimum value $L_{min}$. In this way, the minimum value $L_{min}$ is updated successively.

In step S104, it is judged whether or not the braking device 16 has been operated due to the automatic braking function or due to braking operation by operation of the vehicle occupant 26. If the braking device 16 has been operated, the routine moves on to steps S106, S110. If the braking device 16 is not being operated, the routine moves on to step S102, and updating processing of the minimum value $L_{min}$ is carried out.

In the processing of FIG. 4, the processings of steps S106, S108 and the processings of steps S110 through S114 are executed in parallel. Note that the processings of steps S106 through S114 may be executed sequentially in the order of step S106 through step S114.

First, in step S106, relative distance d(t), relative velocity v(t), and relative acceleration α(t) between the vehicle ahead 40 and the own vehicle 30 are acquired from the collision predicting sensor 14. Note that t is the time of the point in time when the respective physical amounts are acquired. Note that, hereinafter, there are cases in which the symbol (t) is omitted.

In step S108, on the basis of the relative distance d(t), the relative velocity v(t), and the relative acceleration α(t) between the vehicle ahead 40 and the own vehicle 30 that were acquired in step S106, time to collision TTC(t) that is until a collision with the vehicle ahead 40 is computed by the following formula.

$$TTC(t) = \frac{-v(t) - \sqrt{v(t)^2 - 2 \times \alpha(t) \times d(t)}}{\alpha(t)} \qquad (1)$$

Note that the time to collision TTC(t) that is until a collision with the vehicle ahead 40 may computed by the following formula on the basis of the relative distance d(t) and the relative velocity v(t) between the vehicle ahead 40 and the own vehicle 30 that were acquired in step S106.

$$TTC(t) = \frac{-v(t)}{\alpha(t)} \qquad (2)$$

In step S110, pull-out amount l(t) of the seatbelt 12 is computed.

The minimum value $L_{min}$ of the pull-out amount of the seatbelt 12 can be thought to be the pull-out amount in the state in which the vehicle occupant 26 is seated in the vehicle seat 24 and is not tilting forward. Therefore, the minimum value $L_{min}$ is made to be a reference value for the time of computing the pull-out amount l(t). In the example of FIG. 5, the pull-out amount of the seatbelt 12 at t5 is the minimum value $L_{min}$ of the pull-out amount of the seatbelt 12 from t4 onward.

For example, given that the pull-out amount at point in time t7 is L(t), l(t) is expressed by the following formula.

$$l(t) = L(t) - L_{min} \qquad (3)$$

In this way, in step S110, the pull-out amount l(t) of the seatbelt 12 is computed by subtracting the minimum value $L_{min}$ of the pull-out amount of the seatbelt 12 after the buckle switch 19 has turned on from the pull-out amount L(t) of the seatbelt 12 that is detected by the pull-out amount sensor 21.

In step S112, on the basis of the pull-out amount l(t) that was computed in step S110, a forward tilting amount A(t) of the chest region 28 of the vehicle occupant 26, i.e., the size of the gap S between the vehicle occupant 26 and the seatback 32, is computed by the following formula.

$$A(t) = f(l(t)) \qquad (4)$$

Here, f(l(t)) is a function that computes the forward tilting amount A(t) of the chest region 28 of the vehicle occupant 26 with the pull-out amount l(t) of the seatbelt 12 being a parameter.

The forward tilting amount A(t) of the chest region 28 is described hereinafter.

As shown in FIG. 1, the longitudinal direction of the vehicle is the x-axis, the left-right direction of the vehicle is y-axis, the axis orthogonal to the x-axis and the y-axis is the z-axis, the coordinate of the position of a shoulder anchor 23 is (X, Y, Z), and the coordinate of the initial applied position of the seatbelt 12 on the vehicle occupant 26 is ($x_0$, $y_0$, $z_0$). Note that the applied position is, for example, the position where the applied seatbelt 12 contacts the shoulder of the vehicle occupant 26.

Further, the initial applied position is the applied position of the seatbelt 12 in the usual state in which the braking device 16 is not being operated and the vehicle occupant 26 is not tilting forward, i.e., the state in which the pull-out amount of the seatbelt 12 is the above-described minimum value $L_{min}$ (a state in which the posture of the vehicle occupant 26 is stable).

Distance D between the initial applied position $(x_0, y_0, z_0)$ of the seatbelt 12 and the position $(X, Y, Z)$ of the shoulder anchor 23 is expressed by the following formula.

$$D=\sqrt{(X-x_0)^2+(Y-y_0)^2+(Z-z_0)^2} \quad (5)$$

Further, distance D2 between applied position $(x(t), y_0, z_0)$ of the seatbelt 12 in a case in which the vehicle occupant 26 is tilting forward in the direction of arrow FR, and the position $(X, Y, Z)$ of the shoulder anchor 23, is expressed by the following formula.

$$D2=\sqrt{(X-x(t))^2+(Y-y_0)^2+(Z-z_0)^2} \quad (6)$$

Note that above formula (6) is a formula that presupposes that only the x coordinate changes because, in a case in which the vehicle occupant 26 is tilting forward as an example, the amounts of movement of the applied position in the y-axis direction and the z-axis direction are minute.

Further, an amount of change l(t) in the pull-out amount of the seatbelt 12 in a case in which the vehicle occupant 26 tilts forward is computed by the following formula.

$$l(t)=D2-D \quad (7)$$

Here, by expressing above formula (7) by the formula of A(t) with the forward tilting amount A(t) being $x(t)-x_0$, above formula (4), which computes the forward tilting amount A(t) of the chest region 28 of the vehicle occupant 26 by using the pull-out amount l(t) of the seatbelt 12 as a parameter, is determined.

Figure 6:
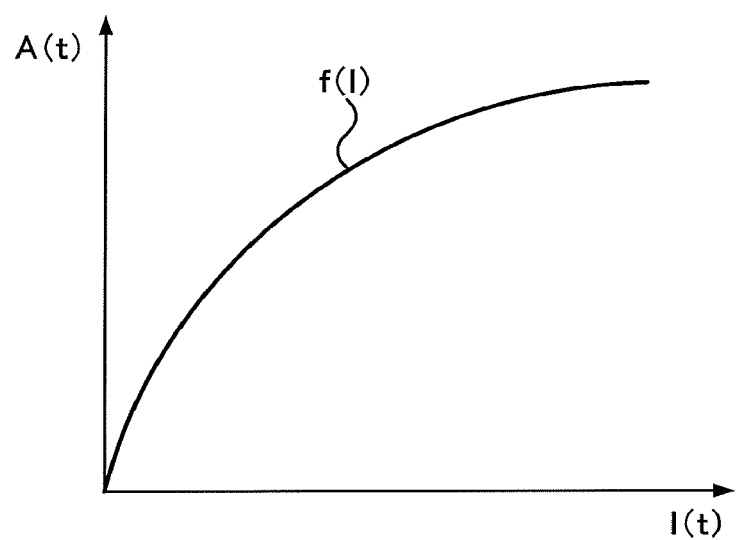
FIG. 6 is a graph showing the relationship between the pull-out amount of the seatbelt and an amount of forward tilting of a vehicle occupant.

Above formula (4) is a function in which A(t) increases as l(t) increases as shown in FIG. 6 for example.

In actuality, the relationship between the pull-out amount l(t) of the seatbelt 12 and the forward tilting amount A(t) of the chest region 28 of the vehicle occupant 26 is determined in advance by, for example, advance experimentation or the like, and above formula (4) is set on the basis of the results thereof.

In step S114, pull-back time T(t) that is required for the vehicle occupant 26 to be pulled-back by an amount corresponding to the forward tilting amount A(t), i.e., the time T(t) until the applied position of the seatbelt 12 returns to the initial applied position in a case in which the vehicle occupant 26 is pulled-back due to the explosive-type pretensioner 18 being operated and the seatbelt 12 being taken-up, is computed from the following formula.

$$T(t)=g(A(t)) \quad (8)$$

Here, g(A(t)) is a function that computes the pull-back time T(t) by using the forward tilting amount A(t) of the chest region 28 of the vehicle occupant 26 as a parameter.

The pull-back time T(t) is described hereinafter.

First, the forward tilting amount A(t) is expressed by the following formula, given that the load that arises toward the vehicle rear side with respect to the vehicle occupant 26 due to the seatbelt 12 being pulled-in in the arrow B direction in FIG. 1 is F(t), and the time required to pull the seatbelt 12 back by an amount corresponding to the forward tilting amount A(t) is T, and the effective mass of the upper body of the vehicle occupant 26 is m.

$$A(t) = \int\int_0^T \frac{F(t)}{m} dt \quad (9)$$

Figure 7:
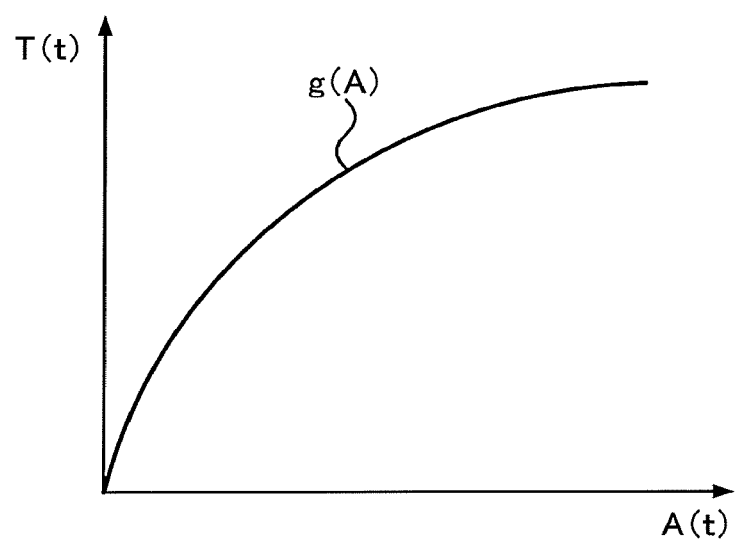
FIG. 7 is a graph showing the relationship between the amount of forward tilting of the vehicle occupant and pull-back time that is required in order to pull the vehicle occupant back by an amount corresponding to the amount of forward tilting.

Then, above formula (8) is obtained by transforming formula (9) into a formula of T. Above formula (8) is a function in which T(t) increases as A(t) increases as shown in FIG. 7 for example. Note that the load F(t) is set in advance in accordance with the load characteristic of the seatbelt 12, and concretely, for example, the magnitude of the force of pulling-back the vehicle occupant 26, or the like. Further, for example, an average value may be set in advance as the effective mass m. However, a scale may be provided beneath the vehicle seat 24, and the mass of the upper body of the vehicle occupant 26 that is measured by this scale may be set as the effective mass m.

In step S116, it is judged whether or not the time to collision TTC(t), which is the time from the braking operation to a collision with the vehicle ahead 40 and which was computed in step S108, is less than or equal to the pull-back time T(t) which was computed in step S114. If the time to collision TTC(t) until a collision with the vehicle ahead 40 is less than or equal to the pull-back time T(t), the routine moves on to step S120.

On the other hand, if the time to collision TTC(t) until a collision with the vehicle ahead 40 is longer than the pull-back time T(t), the routine moves on to step S118.

In step S118, it is judged whether or not to end the judgment processing as to whether or not to start operation of the explosive-type pretensioner 18 and the electric motor 20, i.e., whether or not to temporarily end the processings of steps S106 through S116. Concretely, for example, if the braking operation is cancelled, it may be judged to end the above-described judgment processing, and, if the braking operation is not cancelled, it may be judged to continue the above-described judgment processing. Namely, due to the braking operation being cancelled, it is judged that a front collision with the vehicle ahead 40 has been avoided, and the above-described judgment processing may be ended.

If it is judged that the above-described judgment processing is to be ended, i.e., if it is judged that a front collision with the vehicle ahead 40 has been avoided, the routine moves on to step S104. If it is judged that the above-described judgment processing is to be continued, i.e., if it is judged that a front collision with the vehicle ahead 40 is not being avoided, the routine moves on to steps S106, S110.

On the other hand, in step S120, operation of the explosive-type pretensioner 18 and the electric motor 20 is started. Due thereto, due to the seatbelt 12 being pulled-in in the arrow B direction and force being imparted to the vehicle occupant 26 toward the vehicle rear side, velocity is imparted to the vehicle occupant 26 toward the vehicle rear side. For example, as shown in FIG. 5, if the explosive-type pretensioner 18 and the electric motor 20 are operated simultaneously at point in time t8, the seatbelt 12 is pulled-in rapidly by the explosive-type pretensioner 18 whose force of pulling-in the seatbelt is stronger than that of the electric motor, and thereafter, after the pulling-in of the seatbelt 12 by the explosive-type pretensioner 18 ends, the pulling-in of the seatbelt 12 by the electric motor 20 is continued. Further, if a collision occurs at point in time t9, the vehicle occupant 26 tilts forward greatly due to the collision, and therefore, the pull-out amount of the seatbelt 12 increases rapidly. Note that the timing of the start of operation of the explosive-type pretensioner 18 and the electric motor 20 is not limited to this. For example, in a case in which a collision is predicted, i.e., in a case in which judgment of step S116 is an affirmative judgment, the electric motor 20 may be operated so as to pull-in the seatbelt 12 and eliminate slack, and, in a case in which a collision occurs, the explosive-type pretensioner 18 may be operated and the seatbelt 12 may be pulled-in strongly.

In this way, in the present embodiment, even in a case in which the braking device 16 is operated and a collision with the vehicle ahead 40 is predicted, operation of the explosive-type pretensioner 18 and the electric motor 20 is not started unconditionally, and operation of the explosive-type pretensioner 18 and the electric motor 20 is started only in a case in which the time to collision with the vehicle ahead 40 is less than or equal to the pull-back time that is needed to pull the vehicle occupant 26 back by an amount corresponding to the amount of forward tilting. Namely, operation of the explosive-type pretensioner 18 and the electric motor 20 is started only in a case in which it is predicted that the vehicle occupant 26 and the seatback 32 will not become integral before the collision.

By controlling the timing of starting the operation of the explosive-type pretensioner 18 and the electric motor 20 in this way, the vehicle occupant 26 and the seatback 32 becoming integral before a collision can be prevented. Therefore, energy absorption being insufficient can be prevented, and the performance of protecting the vehicle occupant 26 can be improved.

Other Embodiments

An example of an embodiment of the present invention has been described above. However, the present invention is not limited to the above, and, other than the above, can of course be implemented by being modified in various ways within a scope that does not depart from the gist thereof.

For example, a time to collision estimating section may compute the time to collision on the basis of captured images of the vehicle ahead 40. For example, the surface area of the vehicle ahead 40 may be computed from captured images that capture the vehicle ahead 40 in the usual state which is the state in which the posture of the vehicle occupant 26 is stable, and the time to collision may be computed by comparing the surface area in the usual state and the surface area of the vehicle ahead 40 that is computed from captured images that capture the vehicle ahead 40 in a case in which the braking device 16 is operated.

For example, the force imparting portion may be made to be the electric motor 20 (see FIG. 1) only.

Further, the force imparting portion may be the explosive-type pretensioner 18 (FIG. 1) only. By controlling the energy of the explosive in a step-wise manner, the vehicle occupant 26 can be continued to be moved toward the vehicle rear side.

Figure 8:
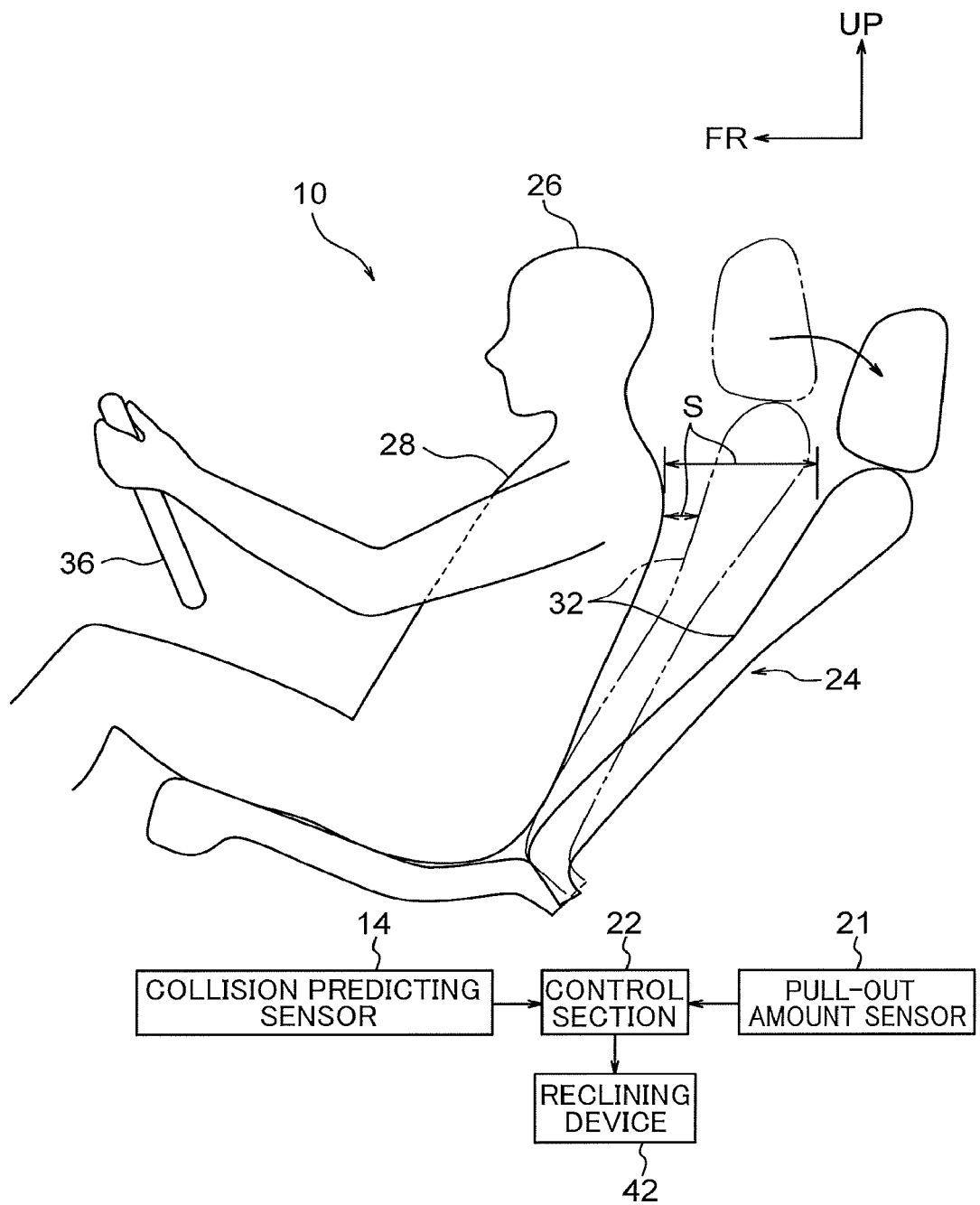
FIG. 8 is a side view and a block drawing showing an example in which a reclining device is used as a gap enlarging portion.
Figure 9:
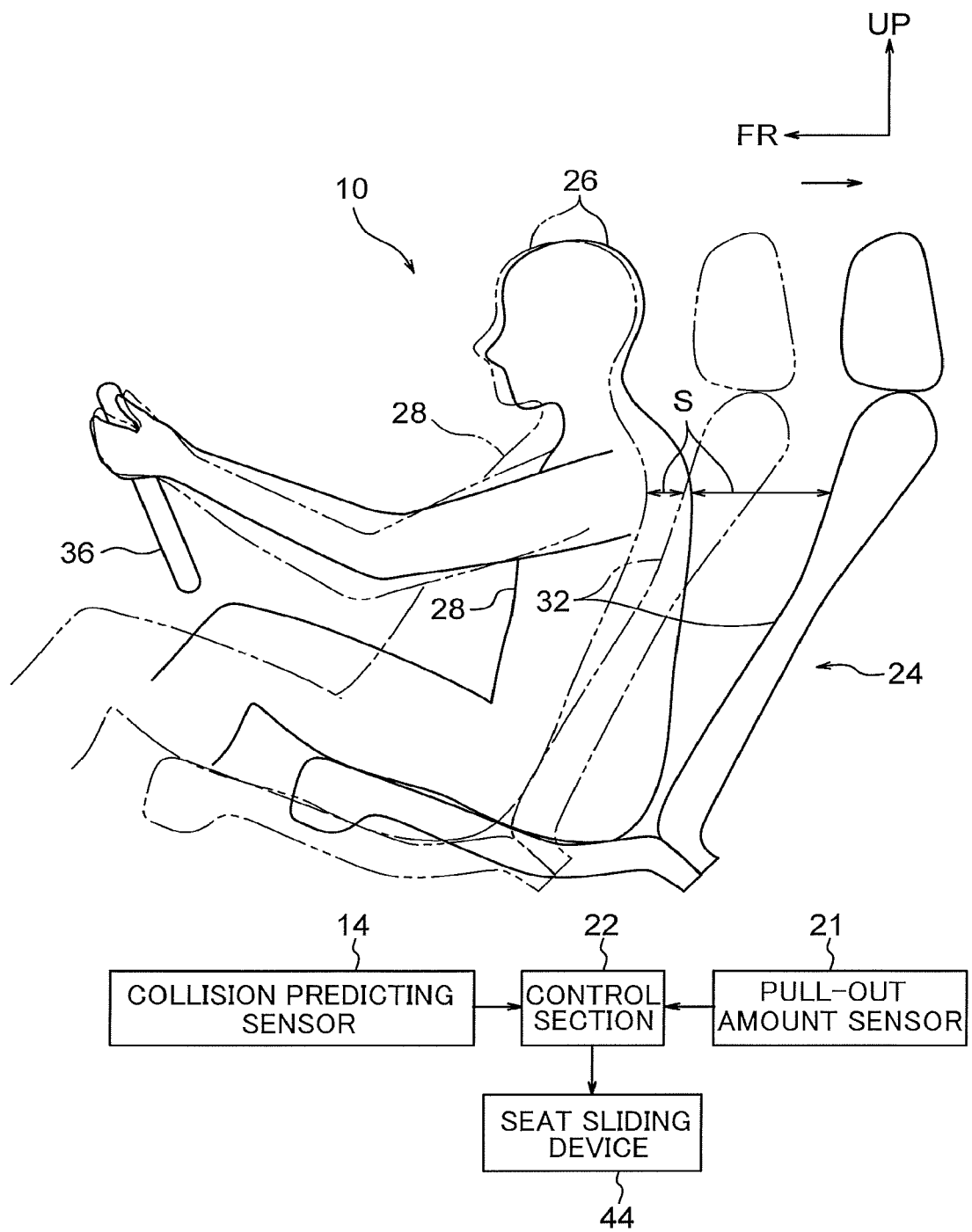
FIG. 9 is a side view and a block drawing showing an example in which a seat sliding device is used as the gap enlarging portion.

The gap enlarging portion is not limited to the braking device 16, and may be a reclining device 42 (FIG. 8) that tilts the seatback 32 rearward, or may be a seat sliding device 44 (FIG. 9) that moves the vehicle seat 24 toward the vehicle rear side, or the like. In FIG. 8 and FIG. 9, the vehicle occupant 26 is wearing a seatbelt (not illustrated).

The gap S between the vehicle occupant 26 and the seatback 32 can be enlarged by tilting the seatback 32 rearward or by moving the vehicle seat 24 toward the vehicle rear side. By using any of various types of gap enlarging portions in this way, the region over which the chest region 28 of the vehicle occupant 26 can move toward the vehicle rear side can be enlarged.

Note that the braking device 16, the reclining device 42 and the seat sliding device 44 may be used by being combined appropriately.

A gap estimating section may estimate the size of the gap S between the vehicle occupant 26 and the seatback 32 on the basis of captured images that capture the vehicle occupant 26 or on the basis of the deceleration of the own vehicle 30.

For example, in a case in which the size of the gap S is estimated on the basis of captured images that capture the vehicle occupant 26, in the usual state that is a state in which the posture of the vehicle occupant 26 is stable, two or more feature points of the vehicle occupant 26 are extracted from the images that capture the vehicle occupant 26, and the distance between the extracted feature points is computed in advance. Then, when the braking device 16 is operated, the distance between these feature points is computed, and, by comparing this distance with the distance between the feature points in the usual state, the size of the gap S is estimated. Note that, for example, the two eyeballs, nostrils, ears, or the like may be used as one set of feature points, but the feature points are not limited to these.

Further, the surface area of the face of the vehicle occupant 26 in the usual state may be computed in advance, and the size of the gap S may be estimated by comparing this surface area with the surface area of the face of the vehicle occupant 26 in a case in which the braking device 16 is operated.

In a case in which the size of the gap S is estimated on the basis of the deceleration of the own vehicle 30, the relationship of correspondence between decelerations and sizes of the gap S may be acquired in advance by experimentation or the like and stored, and the size of the gap S may be determined by using this relationship of correspondence.

Note that the size of the gap S may be estimated by appropriately combining the pull-out amount of the seatbelt, captured images that capture the vehicle occupant 26, and the deceleration of the own vehicle 30.

Further, in the present embodiment, description is given of a case in which the processing shown in FIG. 4 is executed when the braking device 16 is operated. However, for example, by judging whether or not the time to collision TTC(t) is less than or equal to a predetermined threshold value, it may be judged whether or not the possibility of colliding with the vehicle ahead 40 is high, and the processing shown in FIG. 4 may be executed in a case in which the possibility of colliding with the vehicle ahead 40 is high. Further, the processing shown in FIG. 4 may be executed in a case in which the possibility of colliding with the vehicle ahead 40 is high and the braking device 16 is operated.

What is claimed is:

1. An occupant restraining device for a vehicle, comprising:
    a time to collision estimating section that estimates a time to collision, the time to collision being a time until a front collision with a vehicle ahead;
    a force imparting portion that imparts force toward a vehicle rear side to a vehicle occupant of an own vehicle;
    a gap enlarging portion that enlarges a gap between the vehicle occupant and a seatback of a vehicle seat;
    a gap estimating section that estimates a size of the gap between the vehicle occupant and the seatback; and
    a control section that, in a case in which the gap enlarging portion operates, controls a timing of a start of operation of the force imparting portion on the basis of the time to collision estimated by the time to collision estimating section and the size of the gap estimated by the gap estimating section.

2. The occupant restraining device for a vehicle of claim 1, wherein the control section starts the operation of the force imparting portion in a case in which the time to collision is less than or equal to a pull-back time that is needed to pull the vehicle occupant back toward the vehicle rear side by an amount corresponding to the size of the gap.

3. The occupant restraining device for a vehicle of claim 1, wherein the gap estimating section estimates the size of the gap on the basis of at least one of a pull-out amount of a seatbelt that is applied to a vehicle occupant who is seated in the vehicle seat, captured images that capture the vehicle occupant, or deceleration of the own vehicle.

4. The occupant restraining device for a vehicle of claim 1, wherein the gap enlarging portion is at least one of a braking device that decelerates the own vehicle and tilts the vehicle occupant forward by inertia, a reclining device that tilts the seatback rearward, or a seat sliding device that moves the vehicle seat toward the vehicle rear side.

5. The occupant restraining device for a vehicle of claim 1, wherein the force imparting portion is at least one of an explosive-type pretensioner or an electric motor that pulls-in a seatbelt that is applied to a vehicle occupant seated in the vehicle seat.

6. The occupant restraining device for a vehicle of claim 1, wherein the time to collision estimating section carries out at least one of computing the time to collision on the basis of relative distance, relative velocity and relative acceleration between the vehicle ahead and the own vehicle, computing the time to collision on the basis of the relative distance and the relative velocity between the vehicle ahead and the own vehicle, or computing the time to collision on the basis of captured images of the vehicle ahead.

\* \* \* \* \*